H. J. BREWER.
COVER FOR ELECTRIC BATTERIES.
APPLICATION FILED MAY 29, 1908.

900,476.

Patented Oct. 6, 1908.

2 SHEETS—SHEET 1.

Witnesses:
D. W. Gardner.
B. Berg

Inventor:
Horatio J. Brewer
By his Attorney
Geo. Wm. Miatt

H. J. BREWER.
COVER FOR ELECTRIC BATTERIES.
APPLICATION FILED MAY 29, 1908.

900,476.

Patented Oct. 6, 1908.

2 SHEETS—SHEET 2.

Witnesses:
O.W. Gardner.

Inventor:
Horatio J. Brewer
By his Attorney
Geo. Wm. Miatt

UNITED STATES PATENT OFFICE.

HORATIO J. BREWER, OF NEW YORK, N. Y.

COVER FOR ELECTRIC BATTERIES.

No. 900,476.    Specification of Letters Patent.    Patented Oct. 6, 1908.

Application filed May 29, 1908. Serial No. 435,625.

*To all whom it may concern:*

Be it known that I, HORATIO J. BREWER, a citizen of the United States, residing in the borough of Manhattan, city, county, and State of New York, have invented certain new and useful Improvements in Covers for Electric Batteries, of which the following is a specification.

My invention is designed to facilitate and simplify the operation of assembling the parts of batteries in which the electrodes are supported upon and suspended from the cover of the jar; also to effect the inclination of the positive zinc rod electrode with relation to and away from the negative electrode for the purpose of guarding against contact between the electrodes when in their normal positions, and eliminating or reducing the danger of deleterious local action with the battery; and in this connection my object is also to adapt the cover to the requirements of negative electrodes of different characters and sizes, as hereinafter more fully set forth.

The invention consists in the specific construction described and claimed.

Figure 1:
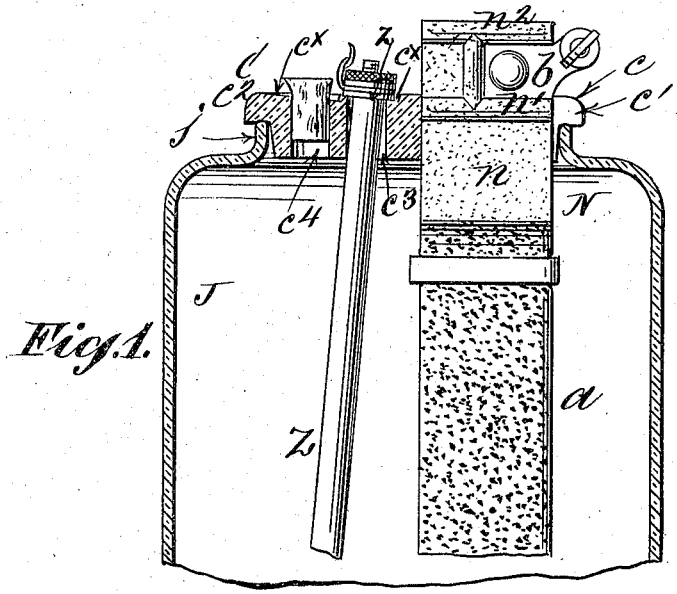
Figure 2:
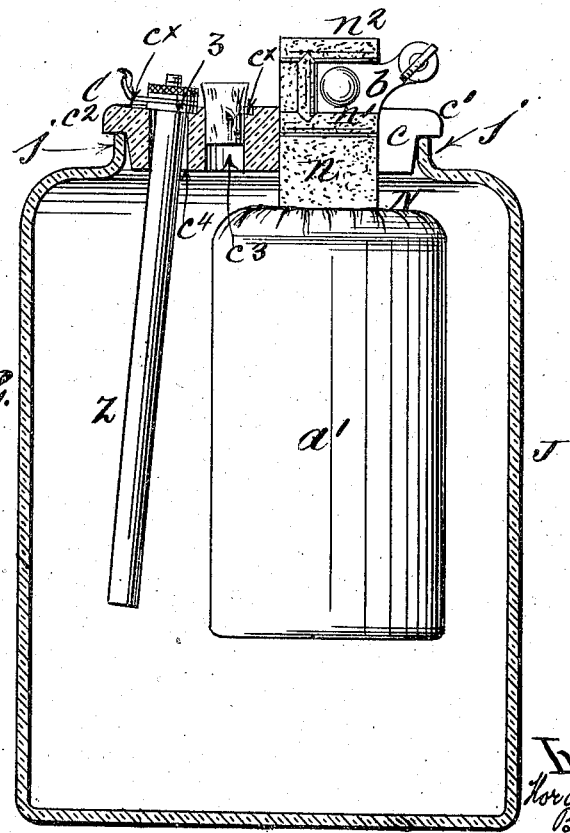
Figure 3:
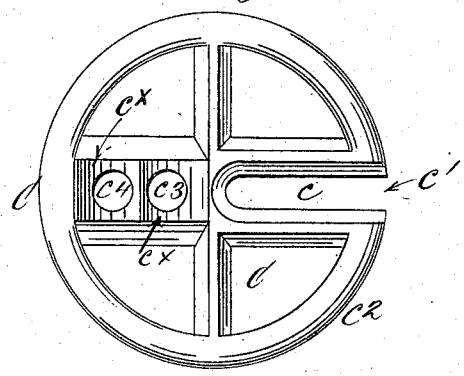
Figure 4:
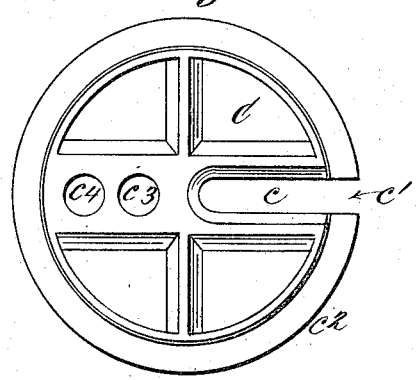
Figure 5:
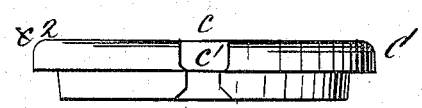
Figure 6:
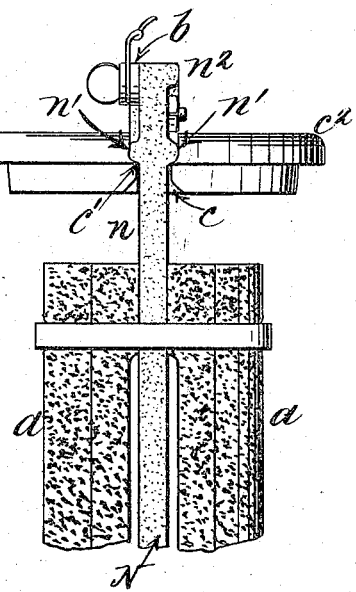

In the accompanying drawings, Figure 1, is a sectional elevation of the upper portion of a battery jar illustrating the use of my improved cover with a carbon negative electrode carrying slabs of agglomerate; Fig. 2, is a sectional elevation of a battery jar provided with my improved cover and showing a negative electrode consisting of a carbon surrounded with a bag of depolarizing material; Fig. 3, is a top view of the cover; Fig. 4, a view of the under side of the cover; Fig. 5, is an edge view of the cover looking toward the entrance to the electrode slot; Fig. 6, is a like view of the cover and an edge view of the flat carbon negative electrode placed therein with its shoulders resting upon the edges of the receiving slot.

In the class of batteries to which my invention appertains the negative electrode consists of a carbon plate N, the upper portion $n$, of which is broad and flat and is formed with horizontal shoulders $n'$, $n'$, below the head $n^2$, to which the binding post $b$, is attached. On the lower portion of the negative carbon plate N, are supported either slabs of agglomerate $a$, $a$, as in Figs. 1 and 6, or a bag $a'$, containing suitable depolarizing material as in Fig. 2. In assembling the parts in the former case the lower portion of the flat carbon plate N, which is of uniform width and thickness, has heretofore been first passed through a slot in the cover and the slabs $a$, $a$, of agglomerate afterwards applied to the lower portion of the carbon plate, such application of the slabs $a$, $a$, being impeded and rendered inconvenient by reason of the presence of the cover, loose upon the upper portion of the carbon plate N. In the latter case, the bag of depolarizing material forms a part of the negative electrode as prepared for the market, and this form of electrode cannot be applied to the cover heretofore used with the flat carbon plate carrying the slabs of agglomerate $a$, $a$, a comparatively expensive two part cover of special construction having heretofore been provided for this particular form of negative electrode.

It is one of the objects of my invention to dispense with this special cover, and to afford a cover adapted to the reception and support of either of the completed forms of negative electrode above referred to, and at the same time to render the application of either to, or its removal from, the cover more simple and convenient. With this end in view I form my improved cover C, with a radially arranged carbon-receiving slot $c$, which is formed with a mouth or opening $c'$, through the edge or rim $c^2$, of the cover, so that the broad flat portion $n$, of either form of negative electrode may be passed laterally edgewise into said receiving slot $c$, in such manner as to bring the transverse shoulders $n'$, $n'$, on the carbon plate into proper relation to the upper edge of the receiving slot $c$, for the support of the electrode when the cover is applied to the mouth of the jar J, in the usual manner. The rim $j$, of the jar J, under these conditions closes the mouth $c'$, of the receiving slot $c$, and locks the negative electrode in position. If it is desired to remove or replace either form of negative electrode from the cover or to substitute agglomerate slabs $a$, $a$, on the carbon plate N, it is only necessary to lift the cover C from the jar, when the change may be quickly and conveniently effected.

The cover C consists of a suitable material molded or pressed into shape, so that the axes of the holes $c^3$, $c^4$, for the positive zinc electrode are necessarily at right angles to the plane of the cover in order to give clearance for the withdrawal of the mold or dies. In other words it is not commercially practicable to make the axes of said holes $c^3$, $c^4$, for the zinc rod Z inclined with relation to the plane of the cover C. At the same time it is most desirable to obviate as far as possible the danger of contact between the zinc and the negative electrode. For this reason I make the holes $c^3$, $c^4$, for the zinc rod Z, considerably larger in diameter than the diameter of said rod, and form the top of the cover adjoining each of said holes $c^3$, $c^4$, with a bearing surface $c^x$, $c^x$, inclined downward toward the center of the cover C. As a result when the zinc rod Z is inserted in either hole, with its lower washer $z$ (which constitutes practically an annular shoulder on the zinc rod) resting against said inclined surface $c^x$, the longitudinal axis of the rod will be inclined away from the negative electrode, as shown in Figs. 1 and 2, of the drawings, and danger of contact between the electrodes and of undesirable internal action in the battery will be reduced to the minimum.

The degree of inclination of the zinc rod Z, will depend upon its length and center of gravity, which latter, owing to the size of the holes $c^3$, $c^4$, will assume a position in a vertical line coincident with the point of highest contact of the shoulder on the zinc with the cover, the inclination of the bearing surface $c^x$, $c^x$, being made to correspond to or approximate planes at right angles to the longitudinal axis of the zinc when thus inclined.

Two holes $c^3$, $c^4$, are formed in the cover having inclined mouths or openings at different distances from the center of the cover on the portion thereof opposed to that in which the receiving slot $c$, is formed, and preferably in line with the latter, so as to attain a suitable separation of the convergent positive zinc electrode and the negative electrode,—the outer hole $c^4$, being designed for use with the comparatively large bag electrode as shown in Fig. 2, although it is obvious that if preferred the outer hole $c^4$, may be used for the zinc when the other form of negative electrode shown in Fig. 1, is employed, to attain a maximum degree of separation when desired. In either case the inclined bearing surface $c^x$, performs an important service in causing the divergence of the zinc rod away from the negative element, which is an important practical advantage, in that it lessens the danger of actual contact between the electrodes and tends to prevent short circuit or local action within the battery.

The hole not used for the zinc is corked up, and may be used when necessary for the introduction of liquid to replenish that in the jar.

What I claim as my invention and desire to secure by Letters Patent is,

1. In an electric battery of the character designated, the combination with the rim of the mouth of the jar of a cover formed with a slot for the carbon negative plate, said slot extending through the edge of the cover for the reception of said carbon negative plate, and said carbon negative plate formed with a broad flat portion adapted to fit in said slot in the cover, and with lateral shoulders adapted to rest upon the upper edges of said slot, for the purpose described.

2. In an electric battery of the character designated, the combination with the jar of a cover formed with a radially arranged slot for the reception of the carbon negative plate, said carbon negative plate formed with shoulders resting upon the edges of said radial slot, a hole for the positive zinc rod electrode formed in the cover on the side thereof opposed to that in which said radial slot is formed and of a diameter sufficiently larger than that of the zinc electrode to admit of the inclination of the longitudinal axis of the latter, the surface of the cover around the mouth of said hole being inclined toward the center of the cover, and said positive zinc rod electrode provided with an annular shoulder thereon occupying a plane at right angles to the longitudinal axis of the rod and engaging with said inclined surface on the top of the cover, for the purpose described.

HORATIO J. BREWER.

Witnesses:
D. W. GARDNER,
GEO. WM. MIATT.